UNITED STATES PATENT OFFICE.

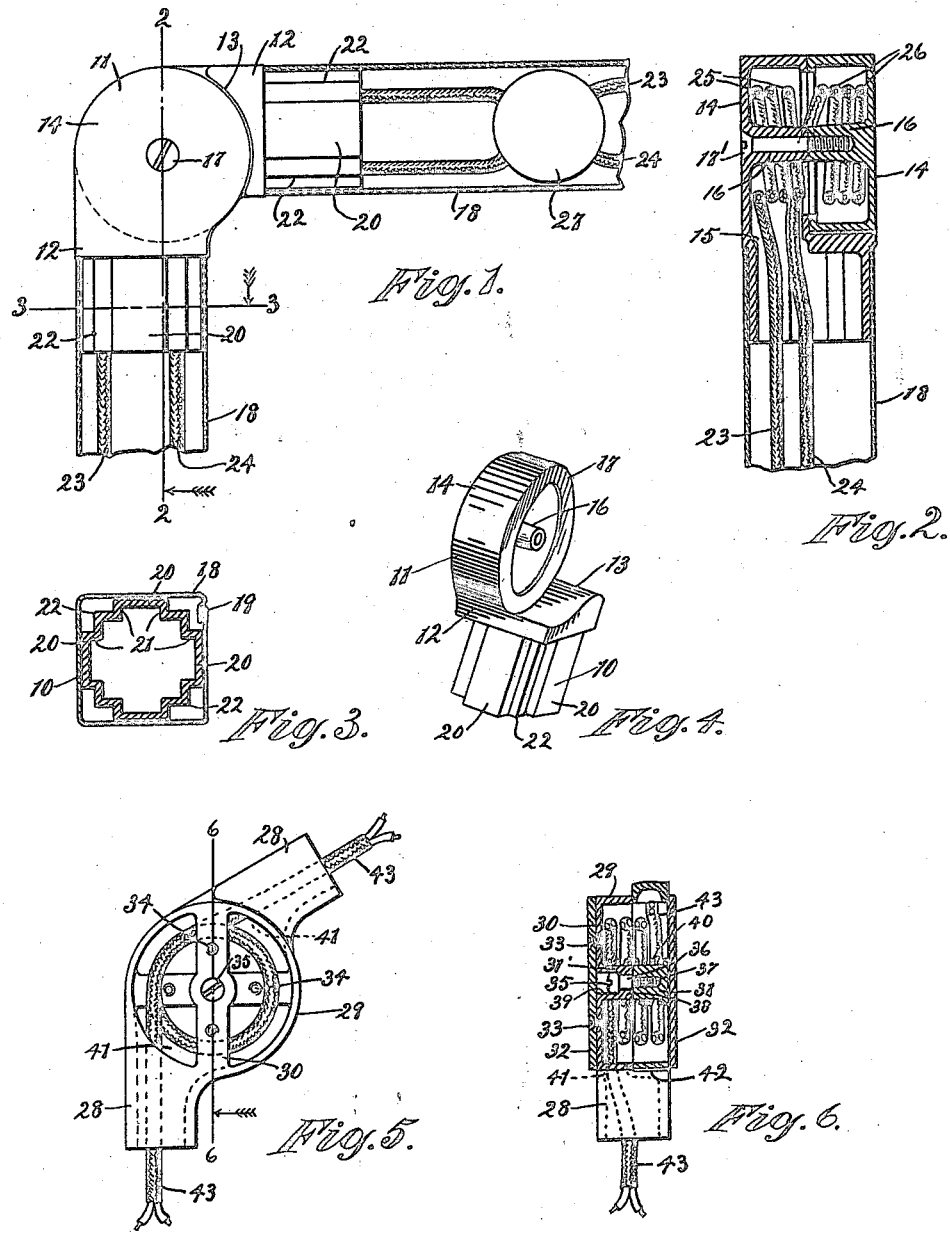

JAMES C. HERRON, OF CHICAGO, ILLINOIS, ASSIGNOR TO REFLECTOR & ILLUMINATING CO., OF CHICAGO, ILLINOIS, A CORPORATION OF ILLINOIS.

JOINT FOR ELECTRICAL CONDUITS.

1,425,011.     Specification of Letters Patent.     Patented Aug. 8, 1922.

Application filed May 12, 1920. Serial No. 380,761.

*To all whom it may concern:*

Be it known that I, JAMES C. HERRON, a citizen of the United States, and resident of Chicago, county of Cook, and State of Illinois, have invented certain new and useful Improvements in Joints for Electrical Conduits, of which the following is a specification, and which are illustrated in the accompanying drawings, forming a part thereof.

The invention relates to joints for electrical conduits and has as an object the provision of a device of this character which may be angularly adjusted without danger of wearing the insulation from contained wiring.

Physical embodiments of the invention are illustrated in the accompanying drawings, in which:—

Fig. 1 is a side view of a joint showing connected conduits in section to expose their interior;

Fig. 2 is a section on line 2—2 of Fig. 1;

Fig. 3 is a section on line 3—3 of Fig. 1;

Fig. 4 is a perspective view of one of the two like members which, when assembled, comprise the form of the invention shown in Figs. 1, 2 and 3;

Fig. 5 is a side view of a modified form with a face plate omitted, and

Fig. 6 is a section on line—6—6 of Fig. 5 with the face plates in place.

The device provided by the invention is designed to be used with conduits of the nature of that shown in a patent granted to F. A. Watkins, September 25, 1907, No. 1,240,907, which conduits are especially useful in lighting show windows. In this service it is frequently necessary to carry the conduits around angles and two of the angles are rarely alike. In the absence of an adjustable angle member it is therefore necessary to have a special angle member constructed for each location. A difficulty with adjustable angle members heretofore proposed has been a danger of wear upon the insulation of contained wiring.

To provide the form of joint shown in Figs. 1, 2 and 3, two members of the form of Fig. 4 are superposed in reversed position one with the other. The element shown in Fig. 4 comprises a portion 10 adapted to telescope within the conduit, a projecting portion 11 which is one-half the thickness of the complete joint and of the portion 12 thereby leaving the shoulder 13 which is preferably made concave so as to approximately fit the periphery of the reversed element comprising the other half of the assembled joint.

The side 14 of the element is preferably permanently closed although a removable plate could be provided after the manner shown in the form of Figs. 5 and 6. The end of portion 10 is closed where it abuts the shoulder 13, but is left open at 15 into the projection 11. At the center of the side 14 a post 16 is shown which stands within the portion 11 and extends to the plane of the edge 17 of said portion 11. The only difference between the two elements that are assembled to make the complete joint as shown is that one post 16 is bored and the plate 14 is counter sunk to receive the screw 17′ while the other post is tapped only, to coact with the end of the screw and the plate 14 of the side may be imperforate.

Conduit 18 of the type with which the form of construction illustrated in Figs. 1 to 4 inclusive is more especially adapted to be used, commonly has an interior lap joint as shown at 19. To adapt the portion 10 of the joint to telescope with the conduit irrespective of the position of the lap 19 the form shown is adopted. This form comprises portions 20 forming portions of the sides of a square sufficiently smaller than the portion 12 of the joint so that the conduit may slip thereover and its exterior may come flush with the exterior of the portion 12. As shown, the corners of the portion 10 comprise instanding portions 21 and an angle 22 joining said portions 21, thus providing reentrant angles at each corner of portion 10.

With the joint assembled as shown in Figs. 1 and 2 the wires 23 and 24 may be run in the conduit and into the joint through one opening 15 when each wire will be given several turns about the posts 16, as shown at 25, 26, and then will extend through the opening 15 of the other joint element. An electric fitting to which the wires may be connected is indicated at 27.

A form of the invention which may be utilized with round conduits is shown in Figs. 5 and 6. As shown, the portions 28 of this form of the invention are circular and may be joined to the conduit, not shown, in any desired manner.

The circular projecting portion 29 of this joint is as shown, a rim with a bridge piece 30 spanning the rim, from which bridge piece the post 31 projects. To close the opening of the rim 29 a face plate 32 may be secured in place as by screws 33 entering tapped holes 34 in the bridge piece 30.

For securing the two portions of the joint shown in Figs. 5 and 6 together, there is shown a screw 35 having a shank 36 and a threaded portion 37. Preferably the shank 36 of the screw is slightly longer than the portion 38 through which it passes so that when the screw is tightened the head thereof will not bind upon the bottom of the hole 39. Under these circumstances adjustment of the angle of the joint will not be likely to loosen or unduly tighten the screw. To prevent rattling, with the parts formed in the relation described, a coil spring 40 is shown which is adapted to press the two portions of the joint outwardly.

The elements making up this form of the joint have an opening at 41 corresponding to that at 15 above described and a shoulder at 42 which closes a portion of the conduit in the manner of shoulder 13 above referred to. The wiring 43, shown in this instance as a duplex cable, may be passed through one opening 41, may have several turns about the posts 31 and may pass out of the other opening 41.

The joint provided by the invention may be adjusted to give an angle between the conduits connected to its ends of from 180° to zero, or a condition of parallelism. The form of the device shown in Figs. 5 and 6 with the center 44 offset laterally beyond the outlines of portions 28 extended, is capable of being adjusted to a position where the portions 28 are parallel. The only effect upon the wiring, of adjustment of the angle of the joint, is a slight tightening or loosening of the turns which action have no bad effect on the insulation.

Many minor changes may be made in the physical embodiment of the invention without departing from its spirit.

I claim as my invention:—

1. A joint for conduits comprising, in combination, two elements, each element comprising a portion adapted to be connected to a conduit, a joint member projecting from said portion having a part of its perimeter formed on the surface of a cylinder and having opposite flat sides, the axis of which cylinder is laterally offset from the center line of said portion, the thickness of said member being one-half the thickness of said portion and a post projecting axially of said member, the height of said post being equal to the thickness of said member the inner ends of the posts and the inner flat sides of the cylindrical parts abutting so as to cause the conduits to be arranged in the same plane, and a screw embedded in one post and extending into the other post to connect the same.

2. A joint for conduits comprising, in combination, two elements, each element comprising a portion adapted to be connected to a conduit, a joint member projecting from said portion having a part of its perimeter formed on the surface of a cylinder and having opposite flat sides, the axis of which cylinder is laterally offset from the center line of said portion, the thickness of said member being one-half the thickness of said portion, a post projecting axially of said member the height of said post equal to the thickness of said member, and means arranged between the opposite outer flat sides of the cylindrical parts to connect said posts together for movement of relative rotation on a common axis.

3. In a conduit joint, a pair of substantially similar members each having a substantially cylindrical and hollow head, a conduit receiving part secured to each head and having a concave shoulder extending outwardly from the inner side face of the head, a post interiorly carried by the center of each head, means to secure the posts together with their inner ends abutting, and a conduit connected to each conduit receiving part and arranged so that the outer sides of the two conduits and the outer sides of the two heads respectively are in the same planes.

4. A joint for electrical conduits comprising, in combination, members connected together for angular movement about a common axis, each member having a portion adapted to telescope with a rectangular conduit having an internal lap joint near one corner, said portion having a reentrant angle at each corner whereby the lap joint of the conduit may have a clearance in any position of the conduit.

5. In a conduit joint, a pair of substantially similar members each having a hollow cylindrical head, a conduit receiving part having a concave end shoulder carried by each head and connected thereto so that the shoulder extends outwardly beyond the inner side face of the head to extend over the complementary head, each head having a perforated central post therewithin, the heads and posts having their inner parts engaged with each other, and a screw extending through one of the posts and into the other posts to connect the members, said heads having their outer side faces formed flat and disposed in the plane of the adjacent portions of the respective conduit receiving parts, and said heads being of equal thickness so as to cause the conduits to lie in the same plane.

JAMES C. HERRON.